UNITED STATES PATENT OFFICE.

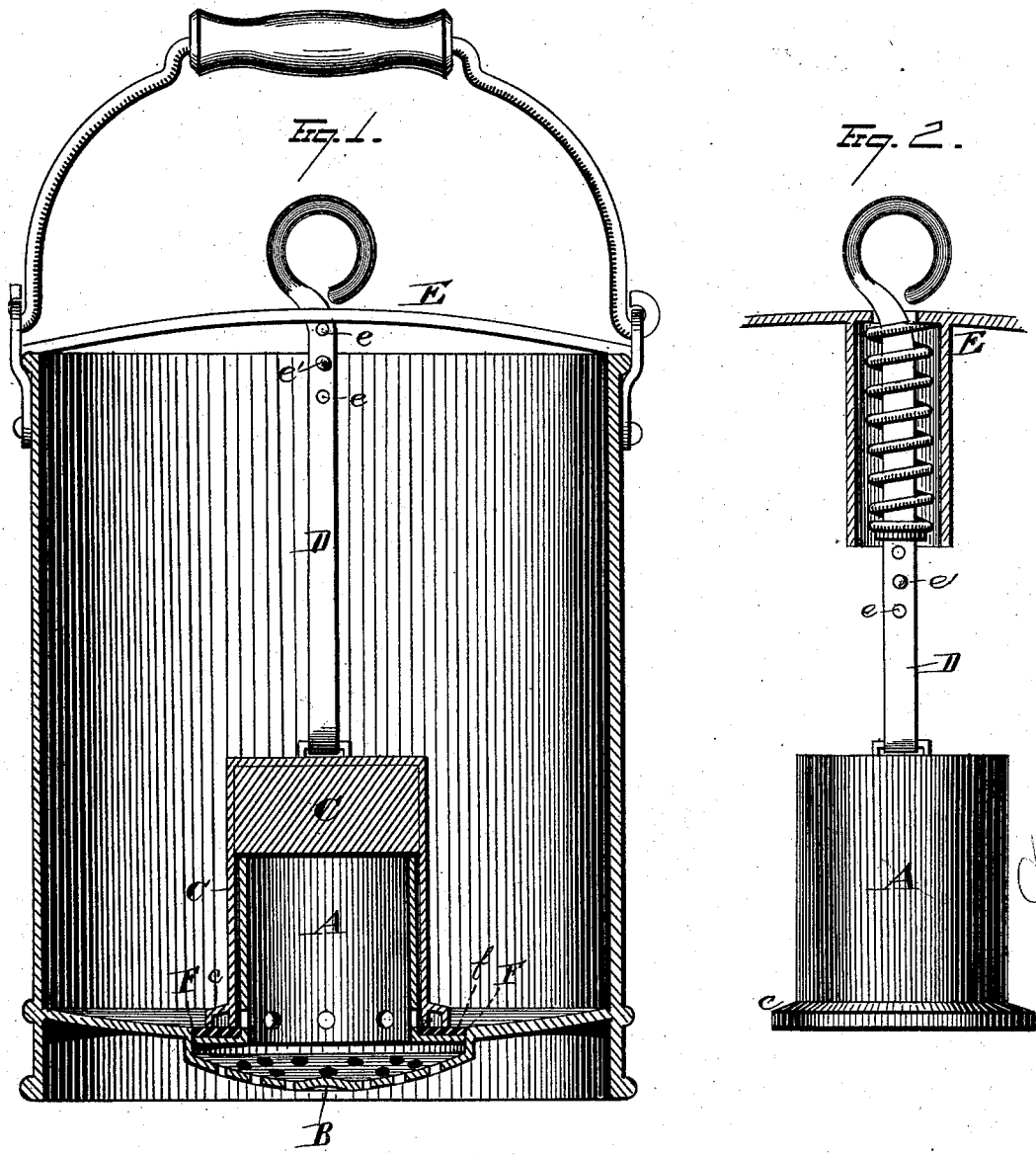

WILLIAM B. ALLEN, OF ORLEANS, NEW YORK.

IMPROVEMENT IN SPRINKLERS.

Specification forming part of Letters Patent No. 209,372, dated October 29, 1878; application filed September 30, 1878.

*To all whom it may concern:*

Be it known that I, WILLIAM B. ALLEN, of Orleans, in the county of Ontario and State of New York, have invented certain new and useful Improvements in Sprinklers; and I do hereby declare the following to be a full, clear, and exact description of the invention, such as will enable others skilled in the art to which it pertains to make and use it, reference being had to the accompanying drawings, which form part of this specification.

My invention relates to a device adapted for use in the ordinary purposes either of a house-sprinkler, a garden watering-pot, or an insect-destroyer. It is especially intended for economical distribution of the liquid or solution which it may contain, and hence can be made sufficiently small to be readily handled by ladies in house use. It is adapted to readily apply its discharge at the point desired in any desired quantity, and with a degree of force which causes said discharge to be quick and fine in its spray.

Heretofore among various other constructions a pot or can has been provided with an upright cylinder in its bottom, in connection with a solid plunger-valve, which works in said cylinder, and by its fall, upon release from being raised, forces the liquid out through a rose. The liquid within said cylinder is in direct contact with the bottom of the plunger, and the volume thereof which is admitted at any certain time into the cylinder depends wholly upon the height to which said plunger is raised. Whether the pot is full or nearly empty of liquid, the same extent of movement of the plunger upward within its cylinder must obtain in order to cause a given volume of said liquid to enter the cylinder preparatory to discharge through the rose.

In addition to the above, the degree of pressure with which a liquid-charge of the cylinder is forced from the latter is only equal to the tendency of the plunger-valve to return to its valve-seat. These disadvantages of construction render it incumbent upon the operator to raise a heavily-weighted or spring-pressed plunger to a considerable height in order to obtain any large charge of liquid within the cylinder, or to eject the same therefrom quickly and with force.

My improvement obviates the above disadvantages, and provides a device which is adapted to permit any suitable quantity of liquid to enter as a charge into the cylinder by raising the valve but slightly. It also causes said charge to be ejected from the rose by means of the force of compressed air, which latter is obtained in part by the inflowing of the liquid into the cylinder and in part by the tendency of the valve to return to the valve-seat upon being released from suspension above the latter.

The invention consists, first, in the combination, with an upright perforated cylinder formed in the bottom of a pot or can and a rose located below the same, of a hollow cylindrical valve having a closed top and adapted to have vertical reciprocation relative to said cylinder; second, in the combination, with a perforated cylinder formed in the bottom of a can or pot, and having its upper end open, while its lower end is provided with a rose, of a hollow cylindrical valve having a closed top and adapted to fit over said cylinder; third, in the combination, with a cylinder formed in the bottom of a pot or can, and having its lower vertical body provided with perforations, together with a rose located below the same, of a hollow cylindrical valve fitting over said cylinder, and provided with a weight or spring adapted to cause it to return with force to its valve-seat when released from suspension above the latter; fourth, in the combination, with a perforated cylinder formed in the bottom of a pot or can, a rose located below the same, and a hollow valve adapted to fit over and about said cylinder, of a brace extending across the top of the pot and a valve-stem or handle working in an opening in the brace, said stem or handle being provided with a vertical series of transverse holes and a stop device, whereby the degree of movement of the valve may be adjustably gaged; fifth, in the combination, with a perforated cylinder formed in the bottom of a can or pot and a rose located below the same, of a hollow valve adapted to fit over and about the cylinder, the lower edge of said valve being formed with two or more annular projections and adapted to engage with a flexible packing-ring; sixth, in the combination, with a pot or can whose bottom is formed with an annular recess and a flexible packing-ring which fits in the latter, of a hollow cylindrical valve whose lower edge is provided with two or more ring projections, together with an upright perforated cylinder, about which said valve fits, and a rose located below the bottom of the can; seventh, in the combination, with an upright perforated cylinder located in the bottom of a pot or can and a hollow valve which fits over and about the same, of a rose whose outer convex side is formed with a central imperforate portion, whereby said rose is adapted to discharge radially rather than toward its center.

Referring to the drawings, Figure 1 is a view in vertical section of a pot or can embodying the invention. Fig. 2 is a detail view representing a modification of the mechanism tending to maintain the valve upon its valve-seat.

An upright cylinder, A, is formed in the bottom of any suitable can or pot, and is formed with an open top, while its bottom connects with a rose, B, located below the same. The lower vertical body of the cylinder is provided with openings of any description and number, which are preferably in the same horizontal plane with the interior side of the bottom of the pot. Over this cylinder a hollow cylindrical valve, C, fits, and is adapted to move vertically about the exterior side thereof, while the closed top of said valve covers the open upper extremity of said cylinder. The lower vertical side of the valve governs the valve-openings made in the cylinder, and by means of a stem or handle, D, the valve is operated. An arched cross-brace, E, extends across the top of the can, preferably in line with the bail-ears, which not only strengthens the can-body, but also provides a vertical guide for said handle as the latter works in an opening formed therein. This handle is provided in its upper body with a vertical series of transverse holes, e, with which a pin, e', or equivalent device, is adapted to respectively engage, in adjustment of the same, higher or lower upon said handle. Instead of the pin, a ring, staple, or other stop could be used for gaging the extent of the vertical movement of the valve. By placing said stop device in any one of the different holes it is caused to come in contact with the under surface of the brace as the operator raises the handle as far as the latter can be raised; and in this way the extent of vertical movement of the valve can be regulated as desired. This construction also causes the discharges to be perfectly uniform and the same both as to the quantity and the force with which they are ejected from the pot.

A further advantage of making the cross-brace as an arch is hence apparent, since such form is better adapted to withstand the force imposed upon the arch by successive contacts of the stop device with its under surface. It is less liable to bend during long-continued use, and therefore serves to maintain the proper relative distance between the holes in the handle and the under surface of said brace.

In the modification view shown in Fig. 2 the holes are formed lower down in the body of the handle, while the stop device is adapted to strike against the lower edge of the tube, within which latter the spring is inclosed, which tends to maintain the valve on its valve-seat.

The valve is formed with two or more annular projections, c, depending from its lower or bearing edge, which engage with a flexible packing-ring, f, constituting the valve-seat. This causes that annular portion of the packing-ring which is inclosed by said valve projections to fit into the space formed between the latter, so that in use the joint may be perfectly tight.

Preferably the bottom of the can is provided with an annular recess, F, formed about the cylinder and adapted to permit said packing-ring to seat therein and have its upper surface flush with the interior side of said can-bottom. The rose is located below the horizontal plane of the can-bottom, and its convex exterior side is provided with an imperforate central portion, B, which tends to cause the discharge to be radial or outward instead of inward or toward the center of the rose.

The valve may be forced down onto its valve-seat after being raised from the same by hand; or it may be made weighted, which is my preferable construction, and thus automatically return to its valve-seat with sufficient force. Instead of a weight, the valve-stem may be downwardly spring-pressed by a spring, whose opposite extremities engage with said stem and the cross-brace, as shown in Fig. 2 of the drawings.

When the valve is raised from its seat the air which fills the cylinder is driven up into the closed top of the latter by the inrush of water through the valve-openings, which are, for this reason, among others, formed in the lower extremity of the cylinder. This compressed air provides an elastic cushion, interposed between the cylinder-charge of liquid and the closed top of the valve, so that when the latter is allowed to fall the liquid does not come into contact at all with said valve-top, but is forcibly ejected from the rose by atmospheric pressure, the power of which is partly derived from the inherent resiliency of the compressed air, and in part by the force of the weight or spring with which the valve is provided.

Having fully described my invention, what I claim as new, and desire to secure by Letters Patent, is—

1. The combination, with an upright perforated cylinder formed in the bottom of a pot or can and a rose located below the same, of a hollow cylindrical valve having a closed top and adapted to have vertical reciprocation relative to said cylinder, substantially as set forth.

2. The combination, with a perforated cylinder formed in the bottom of a can or pot, and having its upper end open, while its lower end is provided with a rose, of a hollow cylindrical valve having a closed top and adapted to fit over said cylinder, substantially as set forth.

3. The combination, with a cylinder formed in the bottom of a pot or can, and having its lower vertical body provided with perforations, together with a rose located below the same, of a hollow cylindrical valve fitting over said cylinder, and provided with a weight or spring adapted to cause it to return with force to its valve-seat when released from suspension above the latter, substantially as set forth.

4. The combination, with a perforated cylinder formed in the bottom of a pot or can, a rose located below the same, and a hollow valve adapted to fit over and about said cylinder, of a brace extending across the top of the pot and a valve-stem or handle working in an opening in the brace, said stem or handle being provided with a vertical series of transverse holes and a stop device, whereby the degree of movement of the valve may be adjustably gaged, substantially as set forth.

5. The combination, with a perforated cylinder formed in the bottom of a can or pot, and a rose located below the same, of a hollow valve adapted to fit over and about the cylinder, the lower edge of said valve being formed with two or more annular projections adapted to engage with a flexible packing-ring, substantially as set forth.

6. The combination, with a pot or can, the bottom of which is formed with an annular recess, and a flexible packing-ring which fits in the latter, of a hollow cylindrical valve, the lower edge of which is provided with two or more ring projections, together with an upright perforated cylinder, about which said valve fits, and a rose located below the bottom of the can, substantially as set forth.

7. The combination, with an upright perforated cylinder located in the bottom of a pot or can, and a hollow valve which fits over and about the same, of a rose having outer convex sides formed with a central imperforate portion, whereby said rose is adapted to discharge radially rather than toward its center, substantially as set forth.

In testimony that I claim the foregoing I have hereunto set my hand and seal this 24th day of September, 1878.

WILLIAM B. ALLEN. [L. S.]

Witnesses:
  JACOB A. WADER,
  H. P. CHAPPER.